United States Patent
Gu et al.

(10) Patent No.: US 11,521,580 B2
(45) Date of Patent: Dec. 6, 2022

(54) DISPLAY APPARATUS AND VIRTUAL REALITY DISPLAY SYSTEM FOR GENERATING A TEMPORARY IMAGE BASED ON HEAD TRACKING INFORMATION

(71) Applicant: Samsung Display Co., Ltd., Yongin-Si (KR)

(72) Inventors: Bon-Seog Gu, Suwon-si (KR); Hong Soo Kim, Hwaseong-si (KR); Woomi Bae, Daegu (KR); Sangho Park, Hwaseong-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/920,395

(22) Filed: Jul. 2, 2020

(65) Prior Publication Data
US 2021/0035531 A1 Feb. 4, 2021

(30) Foreign Application Priority Data

Jul. 30, 2019 (KR) .................... 10-2019-0092511

(51) Int. Cl.
| | | |
|---|---|---|
| *G09G 5/36* | (2006.01) | |
| *G09G 5/37* | (2006.01) | |
| *G06F 3/01* | (2006.01) | |

(52) U.S. Cl.
CPC ............. *G09G 5/363* (2013.01); *G06F 3/012* (2013.01); *G09G 5/37* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 2016/0063919 | A1* | 3/2016 | Ha | G06F 3/0346 345/156 |
| 2016/0246057 | A1* | 8/2016 | Hasegawa | H04N 5/7491 |
| 2017/0221185 | A1* | 8/2017 | Inomata | G06T 5/002 |
| 2017/0245379 | A1* | 8/2017 | Kang | G01R 31/52 |
| 2017/0358562 | A1* | 12/2017 | Banna | H01L 25/0753 |
| 2018/0276894 | A1* | 9/2018 | Chang | G06T 19/006 |
| 2018/0352018 | A1 | 12/2018 | Mate et al. | |
| 2019/0251892 | A1* | 8/2019 | Stoll | A63F 13/211 |
| 2019/0311678 | A1* | 10/2019 | Lee | G09G 3/3258 |
| 2019/0317595 | A1* | 10/2019 | Nakata | H04N 13/383 |
| 2021/0144359 | A1* | 5/2021 | Kurata | H04N 13/378 |

FOREIGN PATENT DOCUMENTS

| | | | | |
|---|---|---|---|---|
| KR | 10-1665027 B1 | 10/2016 | | |
| KR | 10-2018-0005528 A | 1/2018 | | |
| KR | 10-2018-0091984 A | 8/2018 | | |
| WO | WO-2017221784 A1 | * 12/2017 | ........... | H04N 13/111 |
| WO | WO-2019037098 A1 | * 2/2019 | ........... | G06F 3/0421 |

* cited by examiner

*Primary Examiner* — Patrick F Valdez
(74) *Attorney, Agent, or Firm* — Innovation Counsel LLP

(57) ABSTRACT

The present disclosure provides a display apparatus including a head tracker obtaining information of movement of a user and formed on a display substrate and generating a temporary image using the information of the movement of the user. The head tracker is configured to output information of movement of a user to the driving controller. The driving controller is configured to generate a temporary image based on the information of the movement of the user. The display panel is configured to selectively display an input image and the temporary image.

17 Claims, 12 Drawing Sheets

MOVEMENT OF VIEW POINT

MOVEMENT OF VIEW POINT

DISPLAY APPARATUS AND VIRTUAL REALITY DISPLAY SYSTEM FOR GENERATING A TEMPORARY IMAGE BASED ON HEAD TRACKING INFORMATION

PRIORITY STATEMENT

This application claims priority under 35 U.S.C. § 119 to Korean Patent Application No. 10-2019-0092511, filed on Jul. 30, 2019 in the Korean Intellectual Property Office KIPO, the contents of which are herein incorporated by reference in their entireties.

BACKGROUND

1. Field

The present disclosure relates to a display apparatus and a virtual reality display system including the display apparatus. More particularly, the present disclosure relates to a display apparatus reducing a dizziness of a user generated due to a delay of an image and a virtual reality display system including the display apparatus.

2. Description of the Related Art

Recently, as consumers' demand for virtual reality increases, many manufacturers have been developing a display system which enables a user to experience the virtual reality (e.g., an HMD system, a VR system, etc). Generally, the viewer wears a glasses-like display system and watches an image displayed by a display device included in the glasses-like display system to experience the virtual reality. Here, the display device included in the glasses-like display system is required to display the image with respect to (or, around) a user's gaze (or, line of sight). In other words, the display device included in the glasses-like display system is required to display an image which reflects the user's gaze. Thus, in a conventional display system, a gaze detecting sensor generates a gate detection signal by detecting the user's gaze, a processing unit (e.g., a central processing unit (CPU), an application processor (AP), etc) generates user's gaze data based on the gaze detection signal, a graphic processing unit (GPU) generates (or, performs rendering) image data which reflects the user's gaze based on the user's gaze data, and a display device receives the image data from the graphic processing unit to display an image which reflects the user's gaze. Furthermore, in the conventional display system, after the user's gaze is changed, the image data is generated by reflecting the changed user's gaze. Thus, a specific delay (i.e., latency) due to image data rendering may occur between a time point at which the user's gaze is changed and a time point at which the image which reflects the changed user's gaze is displayed. As a result, the user may feel dizziness due to the delay when experiencing the virtual reality. For example, because the delay due to the image data rendering, which corresponds to at least one image frame, occurs between the time point at which the user's gaze is changed and the time point at which the image which reflects the changed user's gaze is displayed in the conventional display system, a delay corresponding to at least 16.6 milliseconds (ms) may occur when a display device included in the conventional display system operates at 60 hertz (Hz).

SUMMARY

The present disclosure provides a display apparatus including a head tracker obtaining information of movement of a user and formed on a display substrate and generating a temporary image using the information of the movement of the user.

The present disclosure also provides a virtual reality display system including the above-mentioned display apparatus.

In an example embodiment of a display apparatus according to the present disclosure, the display apparatus includes a head tracker, a driving controller, and a display panel. The head tracker is configured to output information of movement of a user to the driving controller. The driving controller is configured to generate a temporary image based on the information of the movement of the user. The display panel is configured to selectively display an input image and the temporary image.

In an example embodiment, the driving controller may include a temporary image generator configured to generate the temporary image based on previous frame data of the input image and the information of the movement of the user and a comparator configured to output the input image when a coordinate of the input image representing a pointing direction of the input image is equal to a coordinate of the temporary image representing a pointing direction of the temporary image, and configured to output the temporary image when the coordinate of the input image is different from the coordinate of the temporary image.

In an example embodiment, the information of the movement of the user may include a viewpoint coordinate of the user.

In an example embodiment, the temporary image may include a viewpoint image corresponding to the viewpoint coordinate of the user in the previous frame data of the input image and at least one extended image which is generated by extending from at least one edge portion of the viewpoint image in a lateral direction.

In an example embodiment, the information of the movement of the user may further include an acceleration of a head of the user.

In an example embodiment, when the acceleration of the head of the user increases, a width of the viewpoint image of the temporary image may be set to decrease. When the acceleration of the head of the user decreases, the width of the viewpoint image of the temporary image may be set to increase.

In an example embodiment, the head tracker and the driving controller may be disposed on a front surface of a display substrate where a display region of the display panel is formed.

In an example embodiment, the driving controller may be disposed on a front surface of a display substrate where a display region of the display panel is formed. The head tracker may be disposed on a rear surface of the display substrate where the display region of the display panel is not formed.

In an example embodiment, the head tracker may overlap the display region of the display panel.

In an example embodiment, the head tracker and the driving controller may be disposed on a rear surface of a display substrate where a display region of the display panel is not formed.

In an example embodiment, at least one of the head tracker and the driving controller may overlap the display region of the display panel.

In an example embodiment, the display apparatus may further include a data driver configured to convert the input image into a input image data voltage and convert the temporary image into a temporary image data voltage. The driving controller and the data driver may be integrally formed to form an integrated data driver. The head tracker and the integrated data driver may be disposed on a front surface of a display substrate where a display region of the display panel is formed.

In an example embodiment, the display apparatus may further include a data driver configured to convert the input image into a input image data voltage and convert the temporary image into a temporary image data voltage. The driving controller and the data driver may be integrally formed to form an integrated data driver. The integrated data driver may be disposed on a front surface of a display substrate where a display region of the display panel is formed. The head tracker may be disposed on a rear surface of the display substrate where the display region of the display panel is not formed.

In an example embodiment, the head tracker may overlap the display region of the display panel.

In an example embodiment, the display apparatus may further include a data driver configured to convert the input image into a input image data voltage and convert the temporary image into a temporary image data voltage. The driving controller and the data driver may be integrally formed to form an integrated data driver. The head tracker and the integrated data driver may be disposed on a rear surface of a display substrate where a display region of the display panel is not formed.

In an example embodiment, at least one of the head tracker and the integrated data driver may overlap the display region of the display panel.

In an exemplary embodiment, the display apparatus may further include a host configured to output the input image to the driving controller. The head tracker may be configured to output the information of the movement of the user to the host. The host may be configured to generate the input image based on the information of the movement of the user.

In an example embodiment of a virtual reality display system according to the present disclosure, the virtual reality display system includes a lens unit, a display apparatus, and a housing. The display apparatus is disposed adjacent to the lens unit. The display apparatus includes a head tracker configured to output information of movement of a user to a driving controller, the driving controller configured to generate a temporary image based on the information of the movement of the user, and a display panel configured to selectively display an input image and the temporary image. The housing is configured to receive the lens unit and the display apparatus.

In an example embodiment, the driving controller may include a temporary image generator configured to generate the temporary image based on previous frame data of the input image and the information of the movement of the user and a comparator configured to output the input image when a coordinate of the input image representing a pointing direction of the input image is equal to a coordinate of the temporary image representing a pointing direction of the temporary image, and configured to output the temporary image when the coordinate of the input image is different from the coordinate of the temporary image.

In an example embodiment, the information of the movement of the user may include a viewpoint coordinate of the user. The temporary image may include a viewpoint image corresponding to the viewpoint coordinate of the user in the previous frame data of the input image and at least one extended image which is generated by extending from at least one edge portion of the viewpoint image in a lateral direction.

According to the display apparatus and the virtual reality display system including the display apparatus, the head tracker determining the information of the movement of the user may be formed on the display substrate. The driving controller of the display apparatus may generate the temporary image based on the information of the movement of the user and may output the temporary image to the display panel until the new input image to which the information of the movement of the user is reflected is received from the host.

Thus, the dizziness of the user generated due to the delay of the image may be reduced in the virtual reality display system.

BRIEF DESCRIPTION OF THE DRAWINGS

The above and other features and advantages of the present inventive concept will become more apparent by describing in detailed exemplary embodiments thereof with reference to the accompanying drawings, in which.

DETAILED DESCRIPTION

Hereinafter, the present disclosure will be explained in detail with reference to the accompanying drawings.

Figure 1:
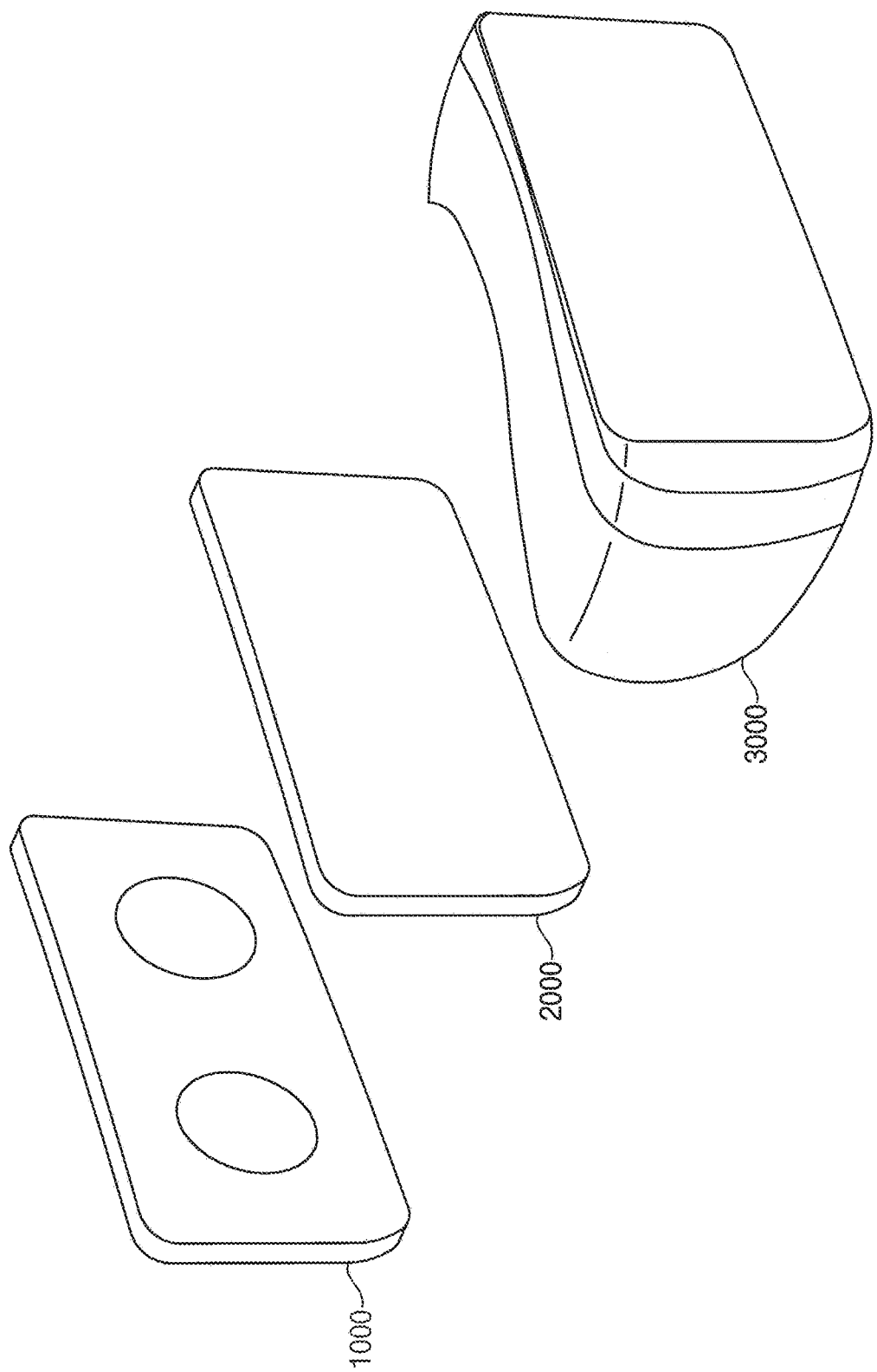
FIG. 1 is a perspective view illustrating a virtual reality display system according to an example embodiment of the present disclosure.

FIG. 1 is a block diagram illustrating a virtual reality display system according to an example embodiment of the present disclosure.

Referring to FIG. 1, the virtual reality display system includes a lens unit 1000, a display part 2000 and a housing 3000. The display apparatus 2000 is disposed adjacent to the lens unit 1000. The housing 3000 may receive the lens unit 1000 and the display apparatus 2000. Although the lens unit 1000 and the display apparatus 2000 are received in a first side of the housing 3000 in FIG. 1, the present inventive concept may not be limited. Alternatively, the lens unit 1000 may be received in a first side of the housing 3000 and the display apparatus may be received in a second side of the housing 3000 opposite to the first side of the housing 3000. When the lens unit 1000 and the display apparatus 2000 are received in the housing 3000 in opposite directions, the housing 3000 may have a transmission area to transmit a light.

For example, the virtual reality display system may be a head mount display system which is wearable by a user. Although not shown in figures, the virtual reality display system may further include a fixing member to fix the virtual reality display system around the head of the user.

Figure 2:
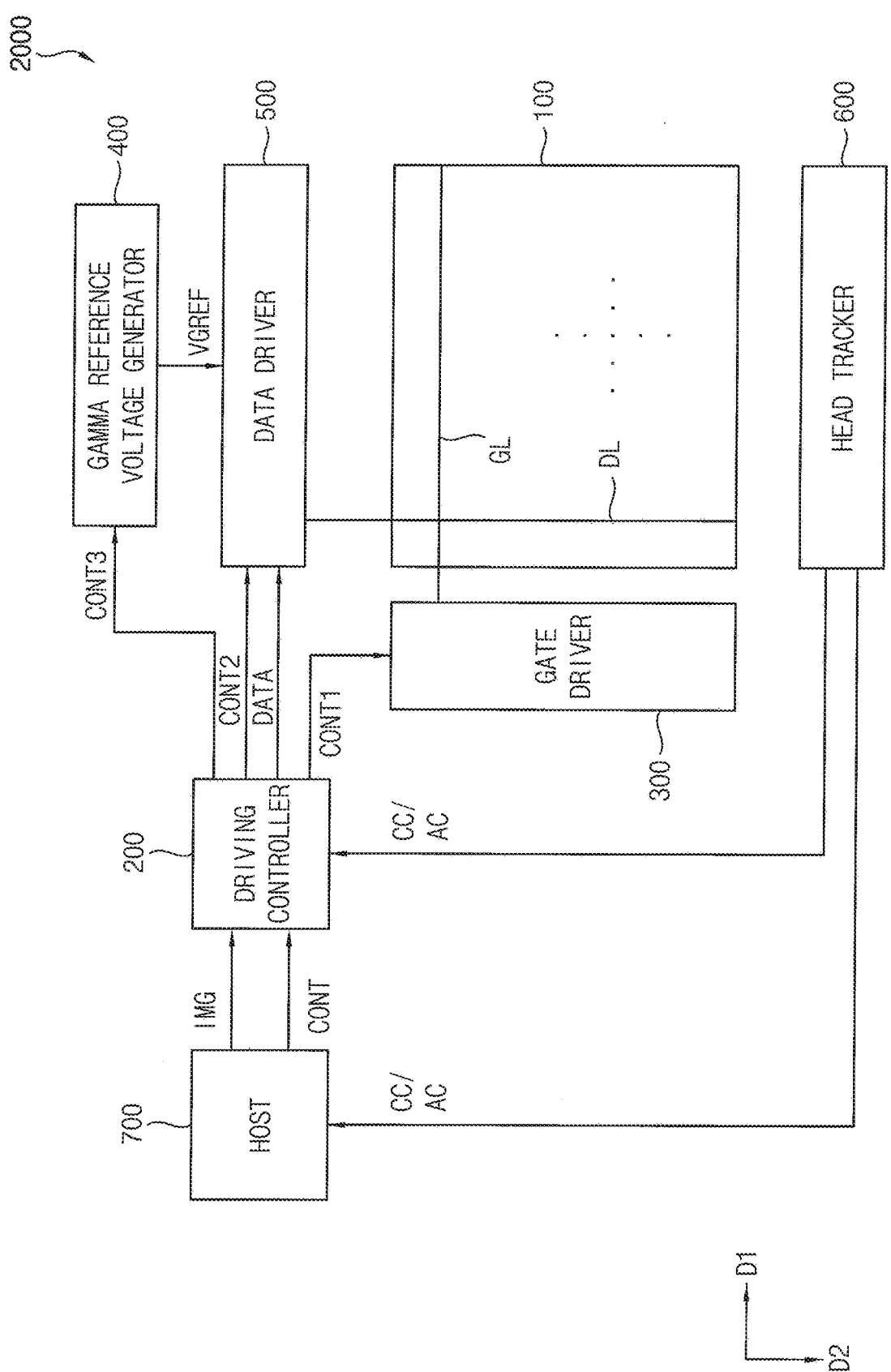
FIG. 2 is a block diagram illustrating a display apparatus of FIG. 1.

FIG. 2 is a block diagram illustrating the display apparatus of FIG. 1.

Referring to FIGS. 1 and 2, the display apparatus 2000 includes a display panel 100 and a display panel driver. The display panel driver includes a driving controller 200, a gate driver 300, a gamma reference voltage generator 400, and a data driver 500. The display apparatus 2000 may further include a head tracker 600. The display apparatus 2000 may further include a host 700.

For example, the driving controller 200 and the data driver 500 may be integrally formed. For example, the driving controller 200, the gamma reference voltage generator 400, and the data driver 500 may be integrally formed. For example, the driving controller 200, the gate driver 300, the gamma reference voltage generator 400, and the data driver 500 may be integrally formed.

The display panel 100 includes a display region and a peripheral region adjacent to the display region.

For example, the display panel 100 may be a liquid crystal display panel including liquid crystal molecules. Alternatively, the display panel 100 may be an organic light emitting diode display panel including organic light emitting diodes.

The display panel 100 includes a plurality of gate lines GL, a plurality of data lines DL, and a plurality of pixels electrically connected to the gate lines GL and the data lines DL. The gate lines GL extend in a first direction D1 and the data lines DL extend in a second direction D2 crossing the first direction D1.

The driving controller 200 receives input image data IMG and an input control signal CONT from the host 700. For example, the driving controller 200 may receive the input image data IMG and the input control signal CONT from the host 700. The input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG and outputs the data signal DATA to the data driver 500. In the present example embodiment, the driving controller 200 may compensate the input image data IMG to generate the data signal DATA.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals to drive the gate lines GL in response to the first control signal CONT1 received from the driving controller 200. The gate driver 300 outputs the gate signals to the gate lines GL. For example, the gate driver 300 may sequentially output the gate signals to the gate lines GL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an example embodiment, the gamma reference voltage generator 400 may be disposed in the driving controller 200 or in the data driver 500.

The data driver 500 receives the second control signal CONT2 and the data signal DATA from the driving controller 200 and receives the gamma reference voltages VGREF from the gamma reference voltage generator 400. The data driver 500 converts the data signal DATA into corresponding data voltages having an analog type using the gamma reference voltages VGREF. The data driver 500 outputs the data voltages to the data lines DL.

The head tracker 600 determines information of movement of the user and outputs the information of the movement of the user to the driving controller 200. In addition, the head tracker 600 outputs the information of the movement of the user to the host 700. For example, the information of the movement of the user may include a viewpoint coordinate CC of the user. For example, the information of the movement of the user may include acceleration AC of the head of the user. For example, the head tracker 600 may include an acceleration measuring device such as an accelerometer.

The host 700 outputs the input image data IMG and the input control signal CONT to the driving controller 200. The host 700 may generate the input image data IMG based on the information of the movement of the user. For example, the host 700 may include a central processing unit (CPU) and a graphic processing unit (GPU).

Figure 3:
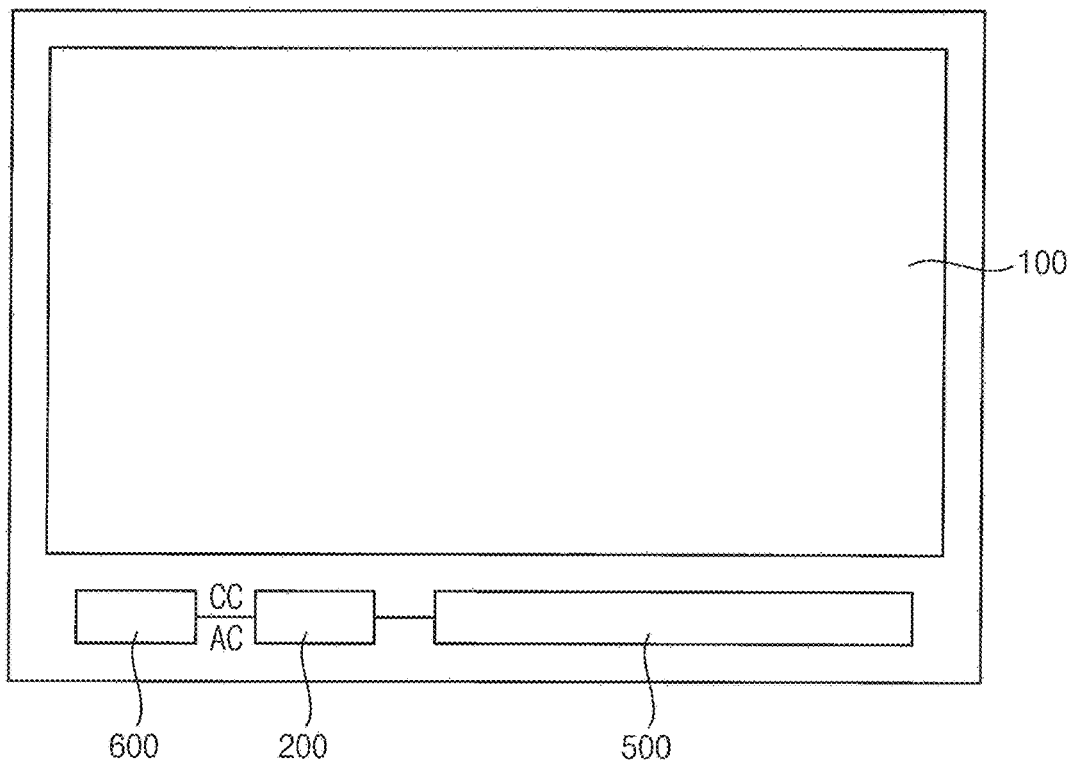
FIG. 3 is a conceptual diagram illustrating a display panel, a driving controller, a data driver and a head tracker of FIG. 1.

FIG. 3 is a conceptual diagram illustrating the display panel 100, the driving controller 200, the data driver 500, and the head tracker 600 of FIG. 1.

Referring to FIGS. 1, 2, and 3, the head tracker 600 and the driving controller 200 may be disposed on a front surface of a display substrate. A display region of the display panel 100 is formed on the front surface of the display substrate. In addition, the data driver 500 may be disposed on the front surface of the display substrate.

The head tracker 600 may directly output the information CC and AC of the movement of the user to the driving controller 200. Thus, the driving controller 200 may quickly receive the information CC and AC of the movement of the user with a little delay.

Figure 4:
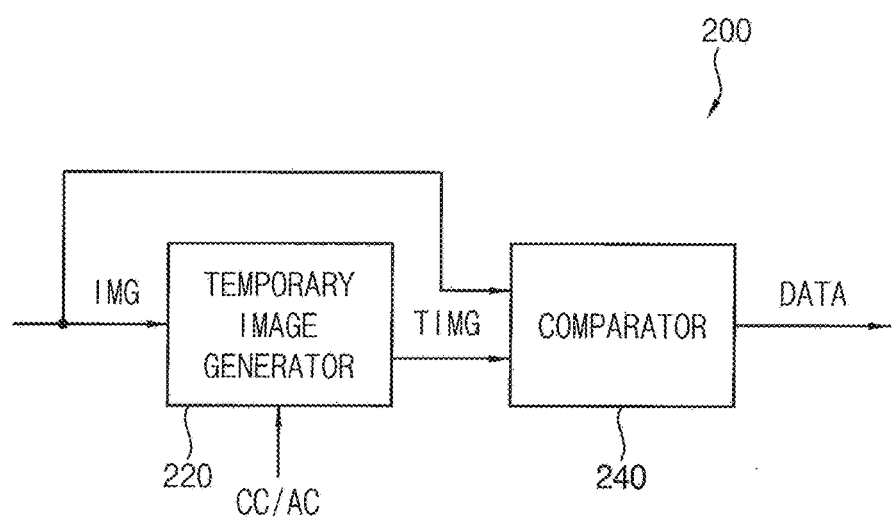
FIG. 4 is a block diagram illustrating the driving controller of FIG. 1.
Figure 5A:
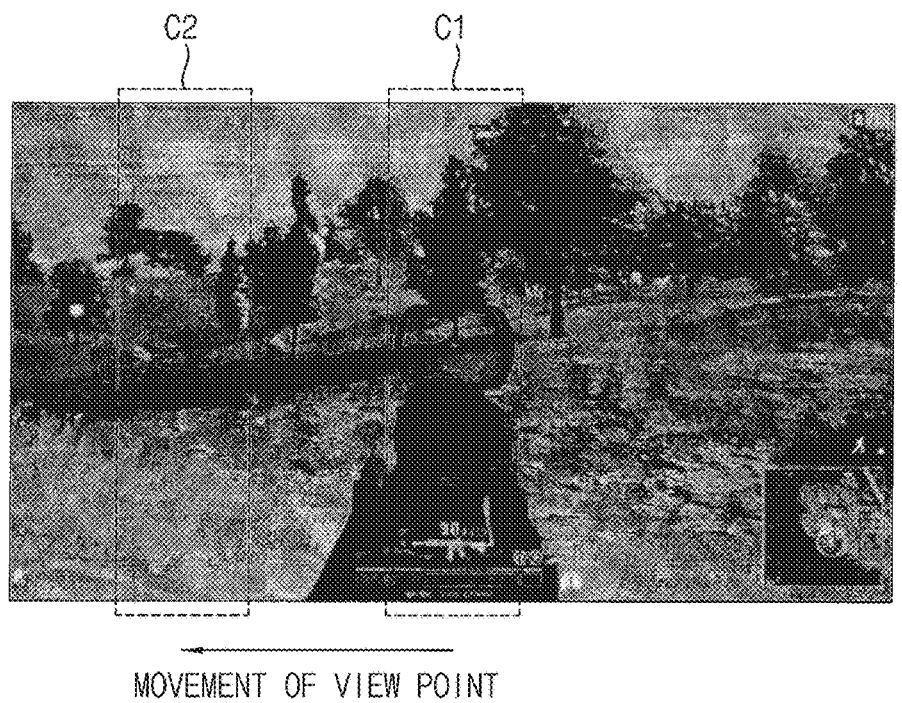
FIG. 5A is a conceptual diagram illustrating an image displayed on the display panel of FIG. 1.
Figure 5B:
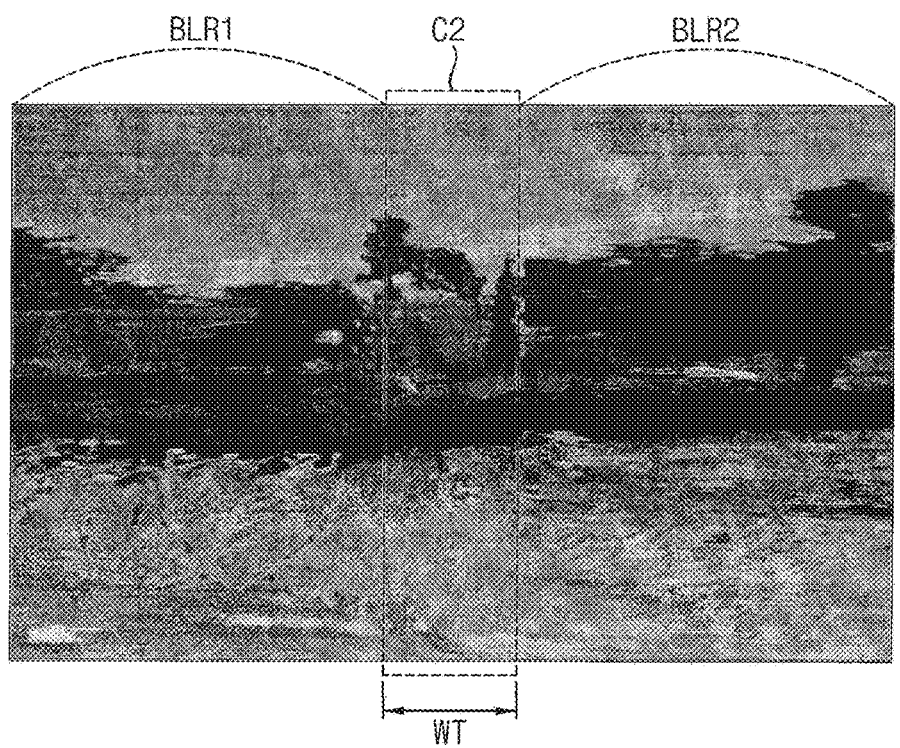
FIG. 5B is a conceptual diagram illustrating a temporary image generated by the driving controller of FIG. 1.

FIG. 4 is a block diagram illustrating the driving controller 200 of FIG. 1. FIG. 5A is a conceptual diagram illustrating an image displayed on the display panel 100 of FIG. 1. FIG. 5B is a conceptual diagram illustrating a temporary image generated by the driving controller 200 of FIG. 1.

Referring to FIGS. 1, 2, 3, 4, and 5B, the driving controller 200 may generate a temporary image TIMG based on the information CC and AC of the movement of the user.

The display panel 100 may selectively display the input image IMG and the temporary image TIMG. Until new input image IMG to which the information CC and AC of the movement of the user is reflected is received from the host 700, the display panel 100 may display the temporary image TIMG which is generated by the driving controller 200.

The driving controller 200 may include a temporary image generator 220 and a comparator 240.

The temporary image generator 220 may generate the temporary image TIMG based on previous frame data of the input image IMG and the information CC and AC of the movement of the user.

The information of the movement of the user may include the viewpoint coordinate CC of the user. The temporary image TIMG may include a viewpoint image C2 corresponding to the viewpoint coordinate CC of the user in the previous frame data of the input image IMG and a first extended image BLR1 and a second extend image BLR2 which are generated by extending an edge portion of the viewpoint image C2 in a horizontal direction.

FIG. 5A represents the input image IMG received from the host 700. For example, the input image IMG is generated by a first viewpoint coordinate C1.

When a viewpoint coordinate of the user is shifted from the first viewpoint coordinate C1 to the second viewpoint coordinate C2, the head tracker 600 outputs the information of the movement of the user to the host 700, and then the host 700 generates a new input image based on the second viewpoint coordinate C2.

In the present example embodiment, when the viewpoint coordinate of the user is shifted from the first viewpoint coordinate C1 to the second viewpoint coordinate C2, the head tracker 600 also outputs the information of the movement of the user to the driving controller 200. The temporary image generator 220 of the driving controller 200 may generate the viewpoint image C2 corresponding to the second viewpoint coordinate C2 of the user and the extended images BLR1 and BLR2 which are generated by extending edge portions of the viewpoint image C2 in the horizontal direction. When the viewpoint coordinate of the user is suddenly shifted, the driving controller 200 may not have an entire image corresponding to the new viewpoint coordinate. Thus, when the viewpoint coordinate of the user is suddenly shifted, the driving controller 200 may temporarily generate the temporary image TIMG by extending the viewpoint image corresponding to a center of the viewpoint of the user in la lateral direction.

When a coordinate of the input image IMG representing a pointing direction of the input image IMG is equal to a coordinate of the temporary image TIMG representing a pointing direction of the temporary image TIMG, the comparator 240 may output the input image IMG. When the coordinate of the input image IMG is different from the coordinate of the temporary image TIMG, the comparator 240 may output the temporary image TIMG. For example, when a central coordinate of the input image IMG is equal to a central coordinate of the temporary image TIMG, the comparator 240 may output the input image IMG. For example, when the central coordinate of the input image IMG is different from the central coordinate of the temporary image TIMG, the comparator 240 may output the temporary image TIMG.

When the viewpoint coordinate of the user is shifted and the new input image IMG to which the information of the movement of the user is reflected is not received from the host 700 yet, the coordinate of the input image IMG is different from the coordinate of the temporary image TIMG. Thus, in this case, the driving controller 200 may output the data signal DATA generated based on the temporary image TIMG to the data driver 500.

When the viewpoint coordinate of the user is shifted and the new input image IMG to which the information of the movement of the user is reflected is received from the host 700, the coordinate of the input image IMG is equal to the coordinate of the temporary image TIMG. Thus, in this case, the driving controller 200 may output the data signal DATA generated based not on the temporary image TIMG but on the new input image IMG the data driver 500.

The information of the movement of the user may further include the acceleration AC of the head of the user. When the acceleration AC of the head of the user increases, a width WT of the viewpoint image C2 of the temporary image TIMG may decreases. In contrast, when the acceleration AC of the head of the user decreases, the width WT of the viewpoint image C2 of the temporary image TIMG may increase.

As the width WT of the viewpoint image C2 of the temporary image TIMG decreases, a width of the extended images BLR1 and BLR2 may increase. In contrast, as the width WT of the viewpoint image C2 of the temporary image TIMG increases, a width of the extended image BLR1 and BLR2 may decrease.

When the acceleration AC of the head of the user increases, an object may not be clearly distinguished so that the width WT of the viewpoint image C2 may decrease to represent the effect of the high acceleration. In addition, when the acceleration AC of the head of the user increases, the user may feel that the object moves fast so that the width WT of the extended images BLR1 and BLR2 which are generated by extending the edge portion of the viewpoint image C2 may be set to increase to represent the effect of the high acceleration.

According to the present example embodiment, the head tracker 600 determining the information CC and AC of the movement of the user may be formed on the display substrate. The driving controller 200 of the display apparatus 2000 may generate the temporary image TIMG based on the information CC and AC of the movement of the user and may output the temporary image TIMG to the display panel 100 until the new input image IMG to which the information CC and AC of the movement of the user is reflected is received from the host 700. Thus, the dizziness of the user generated due to the delay of the image may be reduced in the virtual reality display system.

Figure 6:
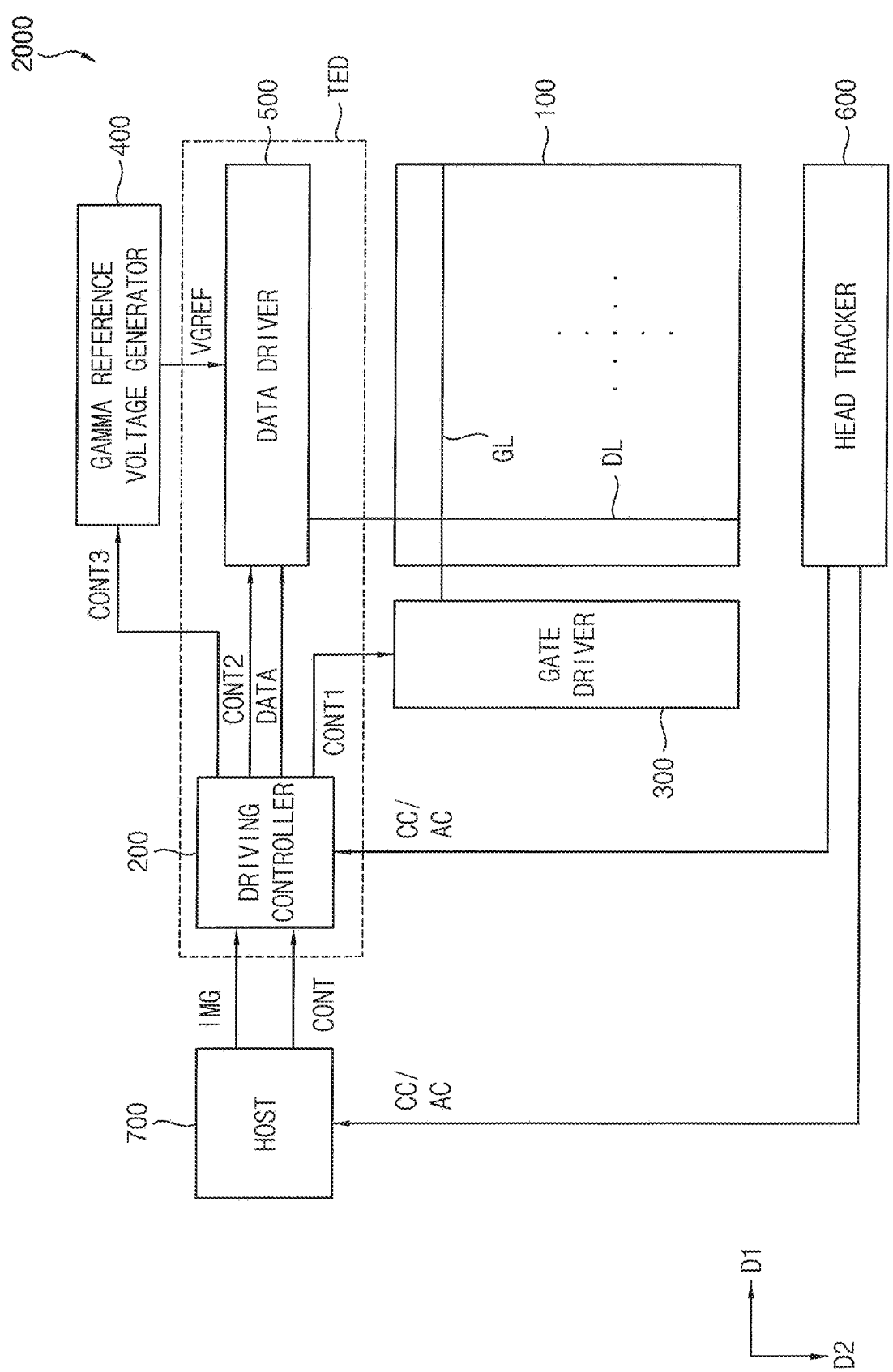
FIG. 6 is a block diagram illustrating a display apparatus according to an example embodiment of the present disclosure.
Figure 7:
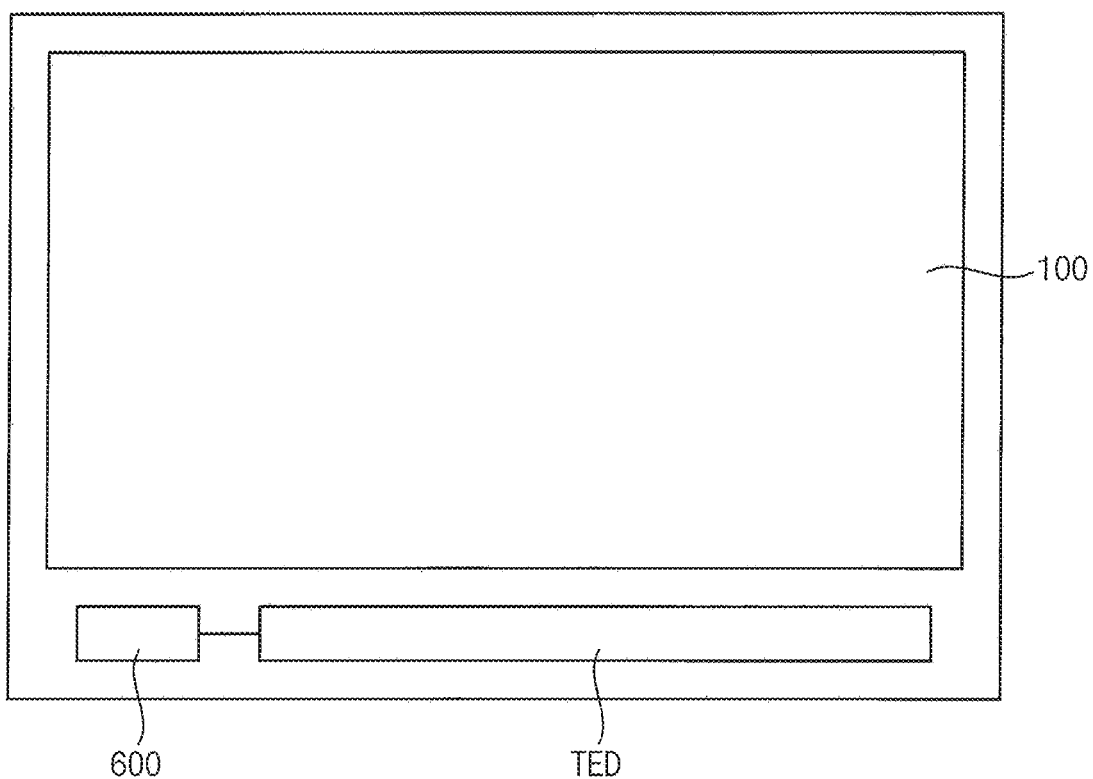
FIG. 7 is a conceptual diagram illustrating a display panel, an integrated data driver and a head tracker of FIG. 6.

FIG. 6 is a block diagram illustrating a display apparatus 2000 according to an example embodiment of the present disclosure. FIG. 7 is a conceptual diagram illustrating a display panel 100, an integrated data driver TED, and a head tracker 600 of FIG. 6.

The display apparatus and the virtual reality display system including the display apparatus according to the present example embodiment is substantially the same as the display apparatus and the virtual reality display system including the display apparatus of the previous example embodiment explained referring to FIGS. 1, 2, 3, 4, 5A, and 5B except that the driving controller and the data driver are integrally formed. Thus, the same reference numerals will be used to refer to the same or like parts as those described in the previous example embodiment of FIGS. 1, 2, 3, 4, 5A, and 5B and any repetitive explanation concerning the above elements will be omitted.

Referring to FIGS. 1 and 4, 5A, 5B, 6, and 7, the virtual reality display system includes a lens unit 1000, a display part 2000 and a housing 3000. The display apparatus 2000 is disposed adjacent to the lens unit 1000. The housing 3000 may receive the lens unit 1000 and the display apparatus 2000.

The display apparatus 2000 includes a display panel 100 and a display panel driver. The display panel driver includes a driving controller 200, a gate driver 300, a gamma reference voltage generator 400 and a data driver 500. The display apparatus 2000 may further include a head tracker 600. The display apparatus 2000 may further include a host 700.

In the present example embodiment, the driving controller 200 and the data driver 500 may be integrally formed to form the integrated data driver TED.

The head tracker 600 and the integrated data driver TED may be disposed on a front surface of a display substrate. A display region of the display panel 100 is formed on the front surface of the display substrate.

The head tracker 600 may directly output the information CC and AC of the movement of the user to the integrated data driver TED. Thus, the integrated data driver TED may quickly receive the information CC and AC of the movement of the user substantially without any delay.

According to the present example embodiment, the head tracker 600 determining the information CC and AC of the movement of the user may be formed on the display substrate. The integrated data driver TED of the display apparatus 2000 may generate a temporary image TIMG based on the information CC and AC of the movement of the user and may output the temporary image TIMG to the display panel 100 until a new input image IMG to which the information CC and AC of the movement of the user is reflected is received from the host 700. Thus, the dizziness of the user generated due to the delay of the image may be reduced in the virtual reality display system.

Figure 8A:
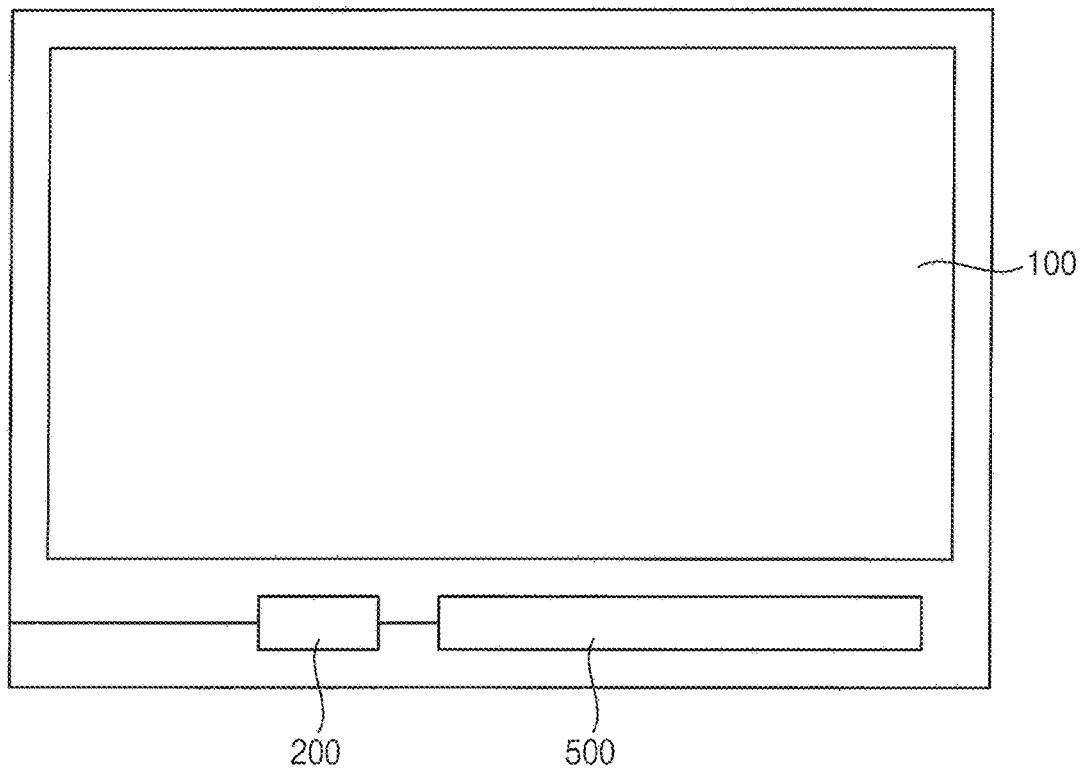
FIG. 8A is a conceptual diagram illustrating a front surface of a display substrate of a display apparatus according to an example embodiment of the present disclosure.
Figure 8B:
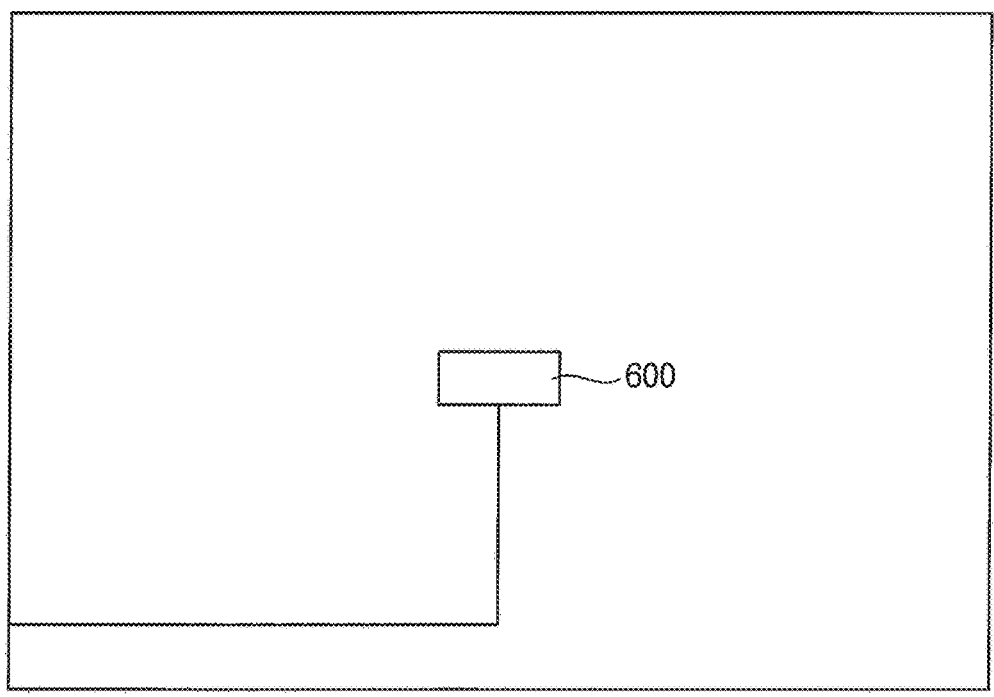
FIG. 8B is a conceptual diagram illustrating a rear surface of the display substrate of FIG. 8A.
Figure 9:
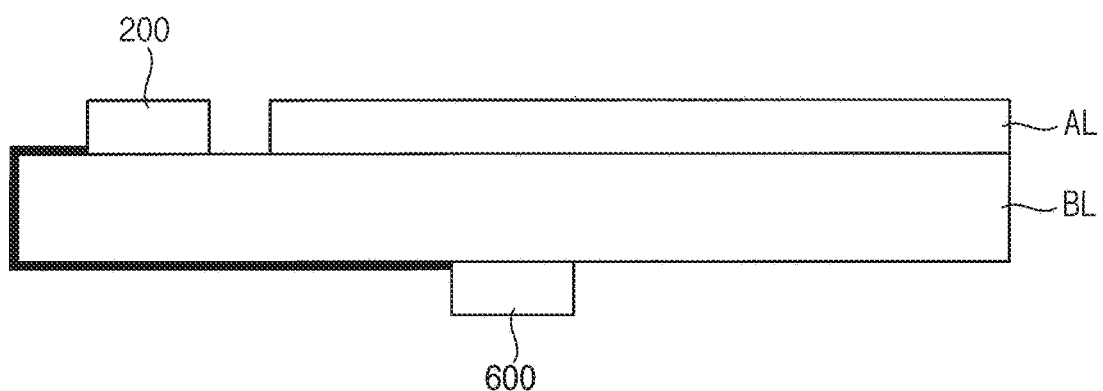
FIG. 9 is a cross sectional view briefly illustrating the display substrate of the FIG. 8A.

FIG. 8A is a conceptual diagram illustrating a front surface of a display substrate of a display apparatus according to an example embodiment of the present disclosure. FIG. 8B is a conceptual diagram illustrating a rear surface of the display substrate of FIG. 8A. FIG. 9 is a cross sectional view briefly illustrating the display substrate of the FIG. 8A.

The display apparatus and the virtual reality display system including the display apparatus according to the present example embodiment is substantially equal to the display apparatus and the virtual reality display system including the display apparatus of the previous example embodiment explained referring to FIGS. 1, 2, 3, 4, 5A, and 5B except for a position of the head tracker 600. Thus, the same reference numerals will be used to refer to the same or like parts as those described in the previous example embodiment of FIGS. 1, 2, 3, 4, 5A, and 5B and any repetitive explanation concerning the above elements will be omitted.

Referring to FIGS. 1, 2, 4, 5A, 5B, 8A, 8B, and 9, the virtual reality display system includes a lens unit 1000, a display part 2000 and a housing 3000. The display apparatus 2000 is disposed adjacent to the lens unit 1000. The housing 3000 may receive the lens unit 1000 and the display apparatus 2000.

The display apparatus 2000 includes a display panel 100 and a display panel driver. The display panel driver includes a driving controller 200, a gate driver 300, a gamma reference voltage generator 400 and a data driver 500. The display apparatus 2000 may further include a head tracker 600. The display apparatus 2000 may further include a host 700.

In the present example embodiment, the driving controller 200 may be disposed on a front surface of a display substrate. A display region of the display panel 100 is formed on the front surface of the display substrate. In addition, the data driver 500 may be disposed on the front surface of the display substrate.

As depicted in FIG. 8B, the head tracker 600 may be disposed on a rear surface of the display substrate. The display region of the display panel 100 may not be formed on the rear surface of the display substrate. The head tracker 600 and the driving controller 200 may be connected to each other through at least a wiring formed along a side surface of a base substrate BL. FIG. 9 represents the wiring formed along the side surface of the base substrate BL and connecting the head tracker 600 and the driving controller 200. However, the present disclosure may not be limited to the positions of the wiring, the side surface, the head tracker 600 and the driving controller 200 shown in FIG. 9.

An active layer AL may be disposed on the base substrate BL. The active layer AL may define the display region of the display panel 100. The driving controller 200 may be disposed on the base substrate BL and spaced apart from the active layer AL.

The head tracker 600 may directly output the information CC and AC of the movement of the user to the driving controller 200. Thus, the driving controller 200 may quickly receive the information CC and AC of the movement of the user substantially without any delay.

In the present example embodiment, the head tracker 600 is disposed on the rear surface of the display substrate so that the head tracker 600 may be disposed without limitation of a location on the rear surface. For example, the head tracker 600 may be disposed on the rear surface of the display substrate in an area overlapping the display region AL of the display panel 100.

According to the present example embodiment, the head tracker 600 determining the information CC and AC of the movement of the user may be formed on the display substrate. The driving controller 200 of the display apparatus 2000 may generate q temporary image TIMG based on the information CC and AC of the movement of the user and may output the temporary image TIMG to the display panel 100 until q new input image IMG to which the information CC and AC of the movement of the user is reflected is received from the host 700. Thus, the dizziness of the user generated due to the delay of the image may be reduced in the virtual reality display system.

Figure 10A:
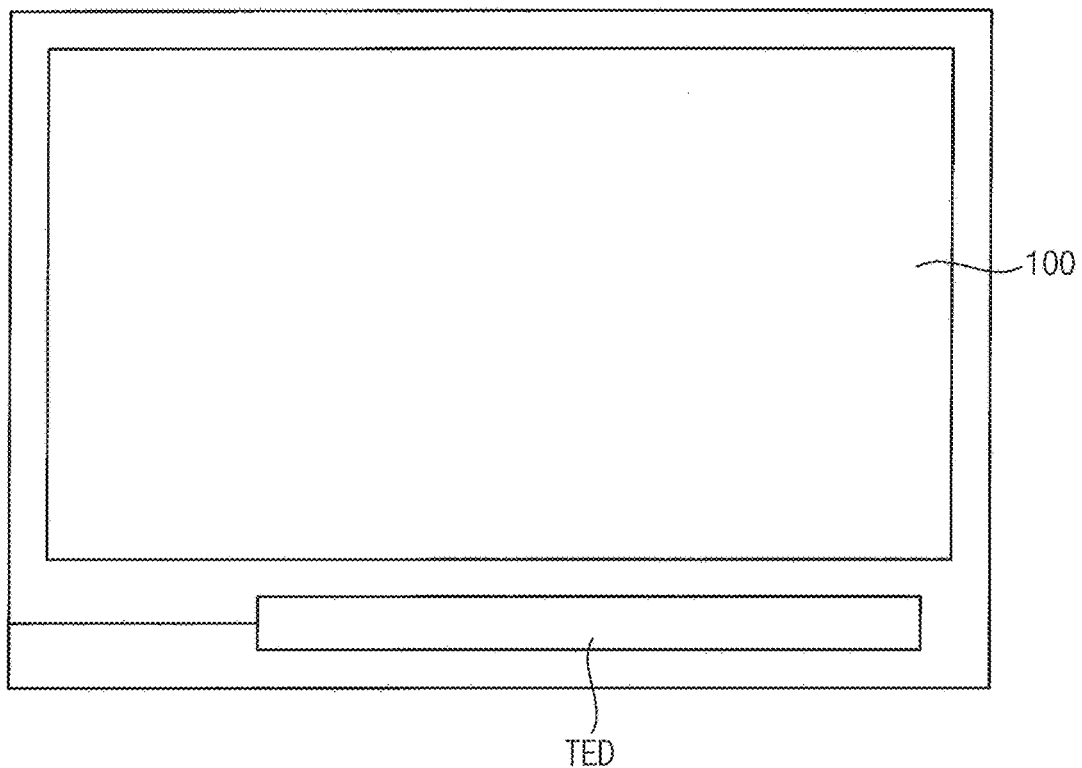
FIG. 10A is a conceptual diagram illustrating a front surface of a display substrate of a display apparatus according to an example embodiment of the present disclosure.
Figure 10B:
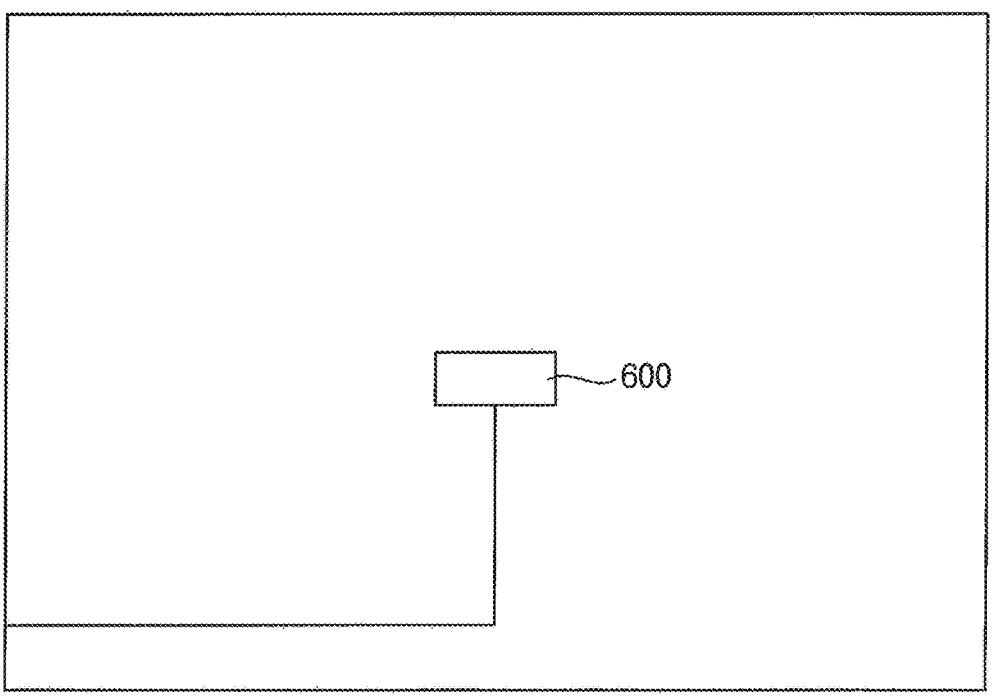
FIG. 10B is a conceptual diagram illustrating a rear surface of the display substrate of FIG. 10A.
Figure 11:
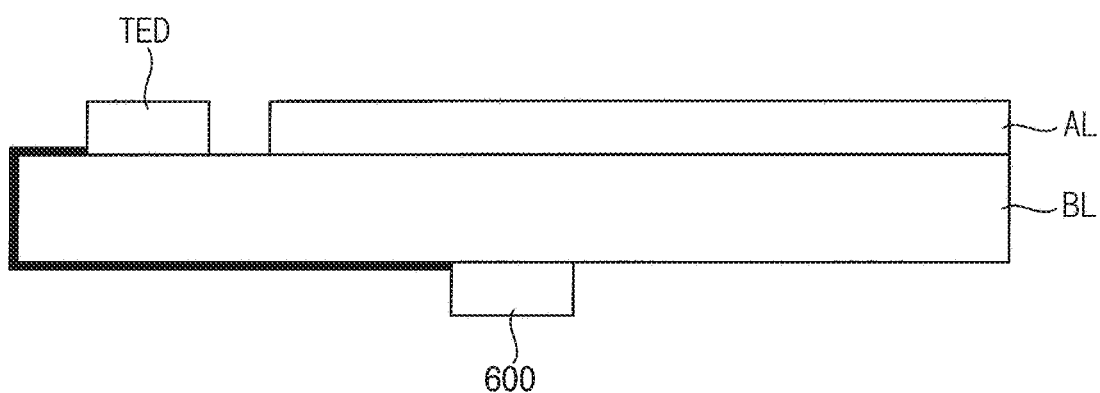
FIG. 11 is a cross sectional view briefly illustrating the display substrate of the FIG. 10A.

FIG. 10A is a conceptual diagram illustrating a front surface of a display substrate of a display apparatus according to an example embodiment of the present disclosure. FIG. 10B is a conceptual diagram illustrating a rear surface of the display substrate of FIG. 10A. FIG. 11 is a cross sectional view briefly illustrating the display substrate of the FIG. 10A.

The display apparatus and the virtual reality display system including the display apparatus according to the present example embodiment is substantially equal to the display apparatus and the virtual reality display system including the display apparatus of the previous example embodiment explained referring to FIGS. 8A, 8B, and 9 except that the driving controller and the data driver are integrally formed. Thus, the same reference numerals will be used to refer to the same or like parts as those described in the previous example embodiment of FIGS. 8A, 8B, and 9 and any repetitive explanation concerning the above elements will be omitted.

Referring to FIGS. 1, 2, 4, 5A, 5B, 10A, 10B, and 11, the virtual reality display system includes a lens unit 1000, a display part 2000 and a housing 3000. The display apparatus 2000 is disposed adjacent to the lens unit 1000. The housing 3000 may receive the lens unit 1000 and the display apparatus 2000.

The display apparatus 2000 includes a display panel 100 and a display panel driver. The display panel driver includes a driving controller 200, a gate driver 300, a gamma reference voltage generator 400 and a data driver 500. The display apparatus 2000 may further include a head tracker 600. The display apparatus 2000 may further include a host 700.

In the present example embodiment, the driving controller 200 and the data driver 500 may be integrally formed to form an integrated data driver TED.

In the present example embodiment, the integrated data driver TED may be disposed on a front surface of a display substrate. A display region of the display panel 100 is formed on the front surface of the display substrate.

The head tracker 600 may be disposed on a rear surface of the display substrate. The display region of the display panel 100 may not be formed on the rear surface of the display substrate. The head tracker 600 and the integrated data driver TED may be connected to each other through a wiring formed along a side surface of a base substrate BL. FIG. 11 represents the wiring formed along the side surface of the base substrate BL and connecting the head tracker 600 and the integrated data driver TED. However, the present disclosure may not be limited to the positions of the wiring, the side surface, the head tracker 600 and the integrated data driver TED shown in FIG. 11.

An active layer AL may be disposed on the base substrate BL and spaced apart from the integrated data driver TED. The active layer AL may define the display region of the display panel 100. The integrated data driver TED may be disposed on the base substrate BL.

The head tracker 600 may directly output the information CC and AC of the movement of the user to the integrated data driver TED. Thus, the integrated data driver TED may quickly receive the information CC and AC of the movement of the user substantially without any delay.

In the present example embodiment, the head tracker 600 is disposed on the rear surface of the display substrate so that the head tracker 600 may be disposed without limitation of a location on the rear surface. For example, the head tracker 600 may be disposed on the rear surface of the display substrate in an area overlapping the display region AL of the display panel 100.

According to the present example embodiment, the head tracker 600 determining the information CC and AC of the movement of the user may be formed on the display substrate. The integrated data driver TED of the display apparatus 2000 may generate a temporary image TIMG based on the information CC and AC of the movement of the user and may output the temporary image TIMG to the display panel 100 until a new input image IMG to which the information CC and AC of the movement of the user is reflected is received from the host 700. Thus, the dizziness of the user generated due to the delay of the image may be reduced in the virtual reality display system.

Figure 12A:
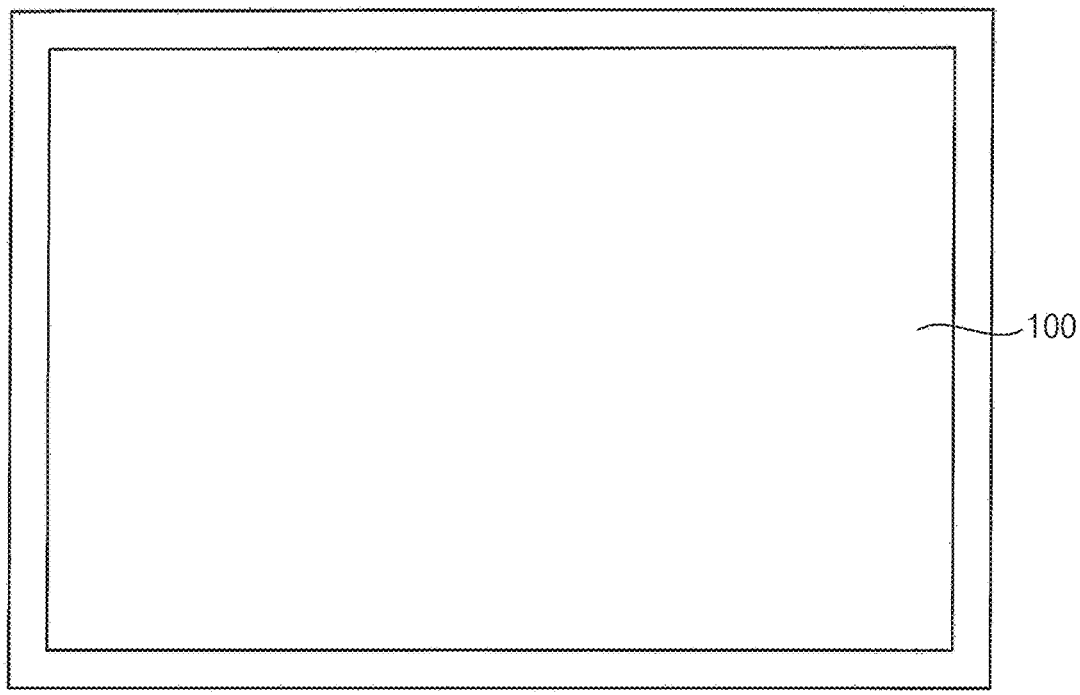
FIG. 12A is a conceptual diagram illustrating a front surface of a display substrate of a display apparatus according to an example embodiment of the present disclosure.
Figure 12B:
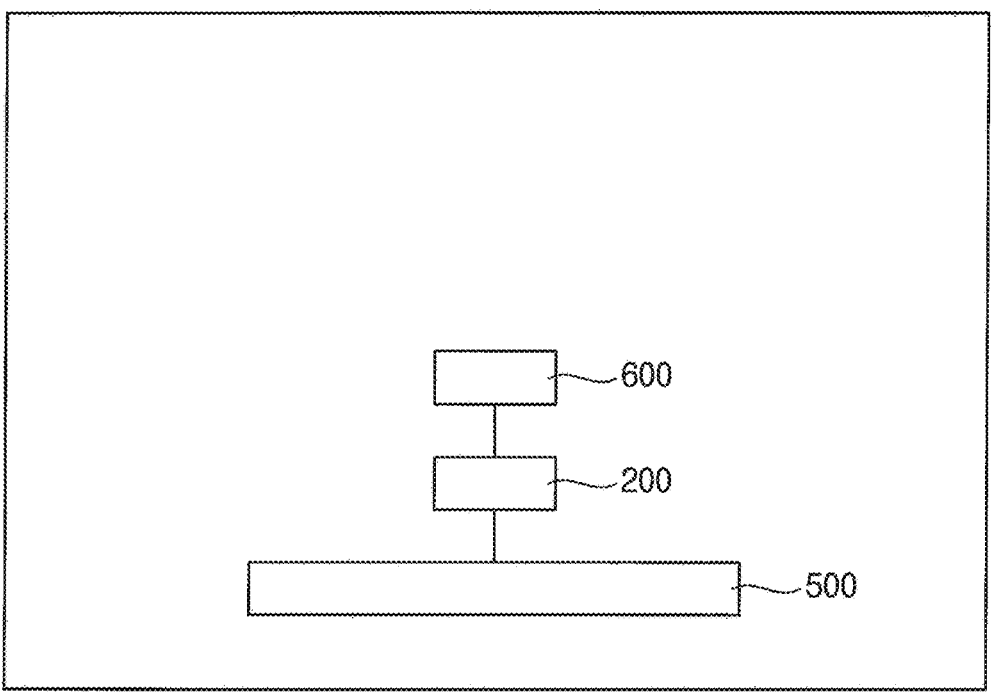
FIG. 12B is a conceptual diagram illustrating a rear surface of the display substrate of FIG. 12A.

FIG. 12A is a conceptual diagram illustrating a front surface of a display substrate of a display apparatus according to an example embodiment of the present disclosure. FIG. 12B is a conceptual diagram illustrating a rear surface of the display substrate of FIG. 12A.

The display apparatus and the virtual reality display system including the display apparatus according to the present example embodiment is substantially equal to the display apparatus and the virtual reality display system including the display apparatus of the previous example embodiment explained referring to FIGS. 1, 2, 3, 4, 5A, and 5B except for a position of the head tracker 600. Thus, the same reference numerals will be used to refer to the same or like parts as those described in the previous exemplary embodiment of FIGS. 1, 2, 3, 4, 5A, and 5B and any repetitive explanation concerning the above elements will be omitted.

Referring to FIGS. 1, 2, 4, 5A, 5B, 12A, and 12B, the virtual reality display system includes a lens unit 1000, a display part 2000 and a housing 3000. The display apparatus 2000 is disposed adjacent to the lens unit 1000. The housing 3000 may receive the lens unit 1000 and the display apparatus 2000.

The display apparatus 2000 includes a display panel 100 and a display panel driver. The display panel driver includes a driving controller 200, a gate driver 300, a gamma reference voltage generator 400 and a data driver 500. The display apparatus 2000 may further include a head tracker 600. The display apparatus 2000 may further include a host 700.

In the present example embodiment, the driving controller 200 and the head tracker 600 may be disposed on a rear surface of the display substrate. The display region of the display panel 100 may be formed on a front surface of the display substrate. The display region of the display panel 100 may not be formed on the rear surface of the display substrate. The data driver 500 may be disposed on the rear surface of the display substrate.

The head tracker 600 may directly output the information CC and AC of the movement of the user to the driving controller 200. Thus, the driving controller 200 may quickly receive the information CC and AC of the movement of the user substantially without any delay.

In the present example embodiment, the head tracker 600 and the driving controller 200 are disposed on the rear surface of the display substrate so that the head tracker 600 and the driving controller 200 may be disposed without limitation of a location on the rear surface. For example, at least one of the head tracker 600 and the driving controller 200 may be disposed on the rear surface of the display substrate in an area overlapping the display region AL of the display panel 100.

In addition, in the present example embodiment, the front surface of the display substrate includes only the display region so that a dead space (a bezel) of the display panel may be reduced.

According to the present example embodiment, the head tracker 600 determining the information CC and AC of the movement of the user may be formed on the display substrate. The driving controller 200 of the display apparatus 2000 may generate a temporary image TIMG based on the information CC and AC of the movement of the user and may output the temporary image TIMG to the display panel 100 until a new input image IMG to which the information CC and AC of the movement of the user is reflected is received from the host 700. Thus, the dizziness of the user generated due to the delay of the image may be reduced in the virtual reality display system.

Figure 13A:
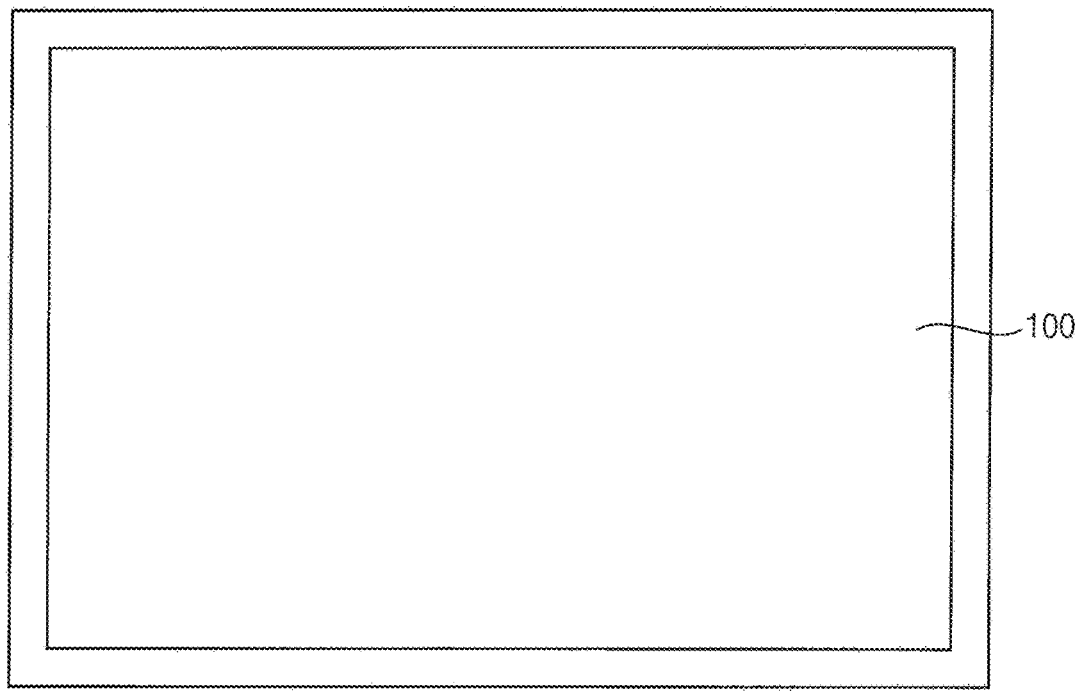
FIG. 13A is a conceptual diagram illustrating a front surface of a display substrate of a display apparatus according to an example embodiment of the present disclosure.
Figure 13B:
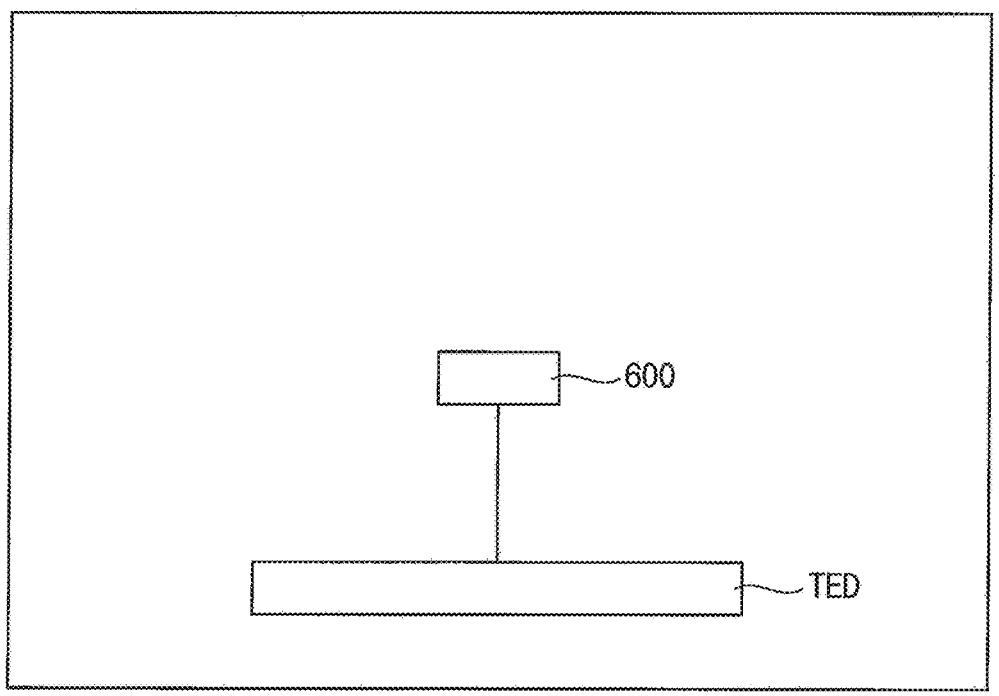
FIG. 13B is a conceptual diagram illustrating a rear surface of the display substrate of FIG. 13A.

FIG. 13A is a conceptual diagram illustrating a front surface of a display substrate of a display apparatus according to an example embodiment of the present disclosure. FIG. 13B is a conceptual diagram illustrating a rear surface of the display substrate of FIG. 13A.

The display apparatus and the virtual reality display system including the display apparatus according to the present example embodiment is substantially equal to the display apparatus and the virtual reality display system including the display apparatus of the previous example embodiment explained referring to FIGS. 12A and 12B except that the driving controller and the data driver are integrally formed. Thus, the same reference numerals will be used to refer to the same or like parts as those described in the previous exemplary embodiment of FIGS. 12A and 12B and any repetitive explanation concerning the above elements will be omitted.

Referring to FIGS. 1, 2, 4, 5A, 5B, 13A, and 13B, the virtual reality display system includes a lens unit 1000, a display part 2000 and a housing 3000. The display apparatus 2000 is disposed adjacent to the lens unit 1000. The housing 3000 may receive the lens unit 1000 and the display apparatus 2000.

The display apparatus 2000 includes a display panel 100 and a display panel driver. The display panel driver includes a driving controller 200, a gate driver 300, a gamma reference voltage generator 400 and a data driver 500. The display apparatus 2000 may further include a head tracker 600. The display apparatus 2000 may further include a host 700.

In the present example embodiment, the driving controller 200 and the data driver 500 may be integrally formed to form the integrated data driver TED.

In the present example embodiment, the integrated data driver TED and the head tracker 600 may be disposed on a rear surface of the display substrate. The display region of the display panel 100 may be formed on a front surface of the display substrate. The display region of the display panel 100 may not be formed on the rear surface of the display substrate.

The head tracker 600 may directly output the information CC and AC of the movement of the user to the integrated data driver TED. Thus, the integrated data driver TED may quickly receive the information CC and AC of the movement of the user substantially without any delay.

In the present example embodiment, the head tracker 600 and the integrated data driver TED are disposed on the rear surface of the display substrate so that the head tracker 600 and the integrated data driver TED may be disposed without limitation of a location on the rear surface. For example, at least one of the head tracker 600 and the integrated data driver TED may be disposed on the rear surface of the display substrate in an area overlapping the display region AL of the display panel 100.

In addition, in the present exemplary embodiment, the front surface of the display substrate includes only the display region so that a dead space (a bezel) of the display panel may be reduced.

According to the present example embodiment, the head tracker 600 determining the information CC and AC of the movement of the user may be formed on the display substrate. The integrated data driver TED of the display apparatus 2000 may generate a temporary image TIMG based on the information CC and AC of the movement of the user and may output the temporary image TIMG to the display panel 100 until a new input image IMG to which the information CC and AC of the movement of the user is reflected is received from the host 700. Thus, the dizziness of the user generated due to the delay of the image may be reduced in the virtual reality display system.

According to the example embodiments of the display apparatus and the virtual reality display system, the dizziness of the user generated due to the delay of the image may be reduced.

The foregoing is illustrative of the present disclosure and is not to be construed as limiting thereof. Although a few example embodiments of the present disclosure have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific example embodiments disclosed, and that modifications to the disclosed example embodiments, as well as other example embodiments, are intended to be included within the scope of the appended claims. The present disclosure is defined by the following claims, with equivalents of the claims to be included therein.

What is claimed is:

1. A display apparatus comprising:
   a host including a central processing unit (CPU) and a graphic processing unit (GPU) and configured to output an input image to a driving controller;
   a head tracker configured to output information of movement of a user to a driving controller;
   the driving controller configured to generate a temporary image based on the information of the movement of the user; and
   a display panel configured to selectively display between an input image and the temporary image,
   wherein, until a new input image to which the information of the movement of the user is reflected is received from the host, the display panel displays the temporary image which is generated by the driving controller,
   wherein the information of the movement of the user includes a viewpoint coordinate of the user, and
   wherein the temporary image includes a viewpoint image corresponding to the viewpoint coordinate of the user in a previous frame data of the input image and at least one extended image which is generated by extending from at least one edge portion of the viewpoint image in a lateral direction.

2. The display apparatus of claim 1, wherein the driving controller comprises:
a temporary image generator disposed inside of the driving controller and configured to generate the temporary image based on the previous frame data of the input image from the host and the information of the movement of the user from the head tracker; and
a comparator disposed inside of the driving controller and configured to output the input image based on the temporary image produced by the temporary image generator when a coordinate of the input image representing a pointing direction of the input image is equal to a coordinate of the temporary image representing a pointing direction of the temporary image, and configured to output the temporary image when the coordinate of the input image is different from the coordinate of the temporary image,
wherein the temporary image generator is electrically connected to the head tracker, the temporary image generator is electrically connected to the comparator.

3. The display apparatus of claim 1, wherein the information of the movement of the user further includes an acceleration of a head of the user.

4. The display apparatus of claim 3, wherein when the acceleration of the head of the user increases, a width of the viewpoint image of the temporary image is set to decrease, and
wherein when the acceleration of the head of the user decreases, the width of the viewpoint image of the temporary image is set to increase.

5. The display apparatus of claim 1, wherein the head tracker and the driving controller are disposed on a front surface of a display substrate where a display region of the display panel is formed.

6. The display apparatus of claim 1, wherein the driving controller is disposed on a front surface of a display substrate where a display region of the display panel is formed, and
wherein the head tracker is disposed on a rear surface of the display substrate where the display region of the display panel is not formed.

7. The display apparatus of claim 6, wherein the head tracker overlaps the display region of the display panel.

8. The display apparatus of claim 1, wherein the head tracker and the driving controller are disposed on a rear surface of a display substrate where a display region of the display panel is not formed.

9. The display apparatus of claim 8, wherein at least one of the head tracker and the driving controller overlaps the display region of the display panel.

10. The display apparatus of claim 1, further comprising a data driver configured to convert the input image into a input image data voltage and convert the temporary image into a temporary image data voltage,
wherein the driving controller and the data driver are integrally formed to form an integrated data driver, and
wherein the head tracker and the integrated data driver are disposed on a front surface of a display substrate where a display region of the display panel is formed.

11. The display apparatus of claim 1, further comprising a data driver configured to convert the input image into a input image data voltage and convert the temporary image into a temporary image data voltage,
wherein the driving controller and the data driver are integrally formed to form an integrated data driver,
wherein the integrated data driver is disposed on a front surface of a display substrate where a display region of the display panel is formed, and
wherein the head tracker is disposed on a rear surface of the display substrate where the display region of the display panel is not formed.

12. The display apparatus of claim 11, wherein the head tracker overlaps the display region of the display panel.

13. The display apparatus of claim 1, further comprising a data driver configured to convert the input image into a input image data voltage and convert the temporary image into a temporary image data voltage,
wherein the driving controller and the data driver are integrally formed to form an integrated data driver,
wherein the head tracker and the integrated data driver are disposed on a rear surface of a display substrate where a display region of the display panel is not formed.

14. The display apparatus of claim 13, wherein at least one of the head tracker and the integrated data driver overlaps the display region of the display panel.

15. The display apparatus of claim 1, wherein the head tracker is configured to output the information of the movement of the user to the host, and
wherein the host is configured to generate the input image based on the information of the movement of the user.

16. A virtual reality display system comprising:
a lens unit;
a display apparatus disposed adjacent to the lens unit and comprising a head tracker configured to output information of movement of a user to a driving controller;
the driving controller configured to generate a temporary image based on the information of the movement of the user;
a display panel configured to selectively display between an input image and the temporary image; and
a housing configured to receive the lens unit and the display apparatus,
wherein, until a new input image to which the information of the movement of the user is reflected is received, the display panel displays the temporary image which is generated by the driving controller,
wherein the information of the movement of the user includes a viewpoint coordinate of the user, and
wherein the temporary image includes a viewpoint image corresponding to the viewpoint coordinate of the user in the previous frame data of the input image and at least one extended image which is generated by extending from at least one edge portion of the viewpoint image in a lateral direction.

17. The virtual reality display system of claim 16, wherein the driving controller comprises:
a temporary image generator configured to generate the temporary image based on previous frame data of the input image and the information of the movement of the user; and
a comparator configured to output the input image when a coordinate of the input image representing a pointing direction of the input image is equal to a coordinate of the temporary image representing a pointing direction of the temporary image and configured to output the temporary image when the coordinate of the input image is different from the coordinate of the temporary image.

* * * * *